US012766787B2

(12) United States Patent
Watkins et al.

(10) Patent No.: US 12,766,787 B2
(45) Date of Patent: Oct. 20, 2026

(54) SYSTEMS AND METHODS FOR IMPROVED LIQUID DROPLET EJECTION FROM A GAS PRESSURIZED PRINTHEAD VIA ARBITRARY PRESSURE AND VACUUM PULSED WAVEFORMS

(71) Applicant: Lawrence Livermore National Security, LLC, Livermore, CA (US)

(72) Inventors: Nicholas Noel Watkins, Brentwood, CA (US); Viktor Sukhotskiy, Livermore, CA (US); Phillip H. Paul, San Francisco, CA (US)

( * ) Notice: Subject to any disclaimer, the term of this patent is extended or adjusted under 35 U.S.C. 154(b) by 405 days.

(21) Appl. No.: 18/511,321

(22) Filed: Nov. 16, 2023

(65) Prior Publication Data

US 2025/0162247 A1 May 22, 2025

(51) Int. Cl.

| | |
|---|---|
| ***B29C 64/209*** | (2017.01) |
| ***B29C 64/112*** | (2017.01) |
| ***B29C 64/255*** | (2017.01) |
| ***B29C 64/295*** | (2017.01) |
| ***B29C 64/393*** | (2017.01) |
| ***B33Y 10/00*** | (2015.01) |
| ***B33Y 30/00*** | (2015.01) |

(Continued)

(52) U.S. Cl.

CPC .......... *B29C 64/209* (2017.08); *B29C 64/112* (2017.08); *B29C 64/255* (2017.08); *B29C 64/295* (2017.08); *B29C 64/393* (2017.08); *B33Y 10/00* (2014.12); *B33Y 30/00* (2014.12); *B33Y 50/02* (2014.12); *G06K 15/16* (2013.01)

(58) Field of Classification Search

None

See application file for complete search history.

(56) References Cited

U.S. PATENT DOCUMENTS

2019/0351488 A1* 11/2019 Vader ........................ B22F 9/06

OTHER PUBLICATIONS

Zhang, Daicong et al. "Geometry control of closed contour forming in uniform micro metal droplet deposition manufacturing," J. Mater. Process, Technol., vol. 243, pp. 474-480, 2017, doi: 10.1016/j.jmatprotec.2017.01.007.

(Continued)

*Primary Examiner* — Anthony M Liang

(74) *Attorney, Agent, or Firm* — HARNESS, DICKEY & PIERCE, P.L.C.

(57) ABSTRACT

The present disclosure relates to a system for droplet-based printing and makes use of a controller and a printhead system. The printhead system has a housing with an internal cavity and a nozzle at a lower end thereof. The internal cavity is configured to hold a quantity of liquid feedstock material. The housing also has a feedstock infeed port for enabling a feedstock material to be fed into the internal cavity. A valve system is used which is in communication with the controller and configured to selectively pressurize the internal cavity in response to control signals received from the controller. The control signals cause operations including a vacuum to be applied to the internal cavity, as well as the internal cavity to be vented to atmosphere as well as pressurized, to thus create a pressure waveform with characteristics tailored to characteristics of the feedstock material, which causes ejection of at least one of a droplet or a material jet that controllably breaks into droplets from the nozzle.

16 Claims, 8 Drawing Sheets

(51) Int. Cl.
*B33Y 50/02* (2015.01)
*G06K 15/16* (2006.01)

(56) References Cited

OTHER PUBLICATIONS

Simonelli, Marco et al. "Towards digital metal additive manufacturing via high-temperature drop-on-demand jetting," Addit. Manuf., vol. 30, p. 100930, Dec. 2019, doi: 10.1016/j.addma.2019.100930.
Liu, Q. et al. "On precision droplet-based net-form manufacturing technology," Proc. Inst. Mech. Eng. Part BJ. Eng. Manuf., vol. 215, No. 10, pp. 1333-1355, Oct. 2001, doi: 10.1243/0954405011519123.
Zhong, Song-yi. et al. "Effect of process parameters on copper droplet ejecting by pneumatic drop-on-demand technology," J. Mater. Process. Technol., vol. 214, No. 12, pp. 3089-3097, Dec. 2014, doi: 10.1016/j.matprotec.2014.07.012.
Luo, Jun et al. "Modeling and characterization of metal droplets generation by using a pneumatic drop-on-demand generator," J. Mater. Process. Technol., vol. 212, No. 3, pp. 718-726, Mar. 2012, doi: 10.1016/j.matprotec.2011.04.041.
Matson, Douglas M. et al. "Impingement behavior of a spray cast aluminum alloy," in Solidification 1998: proceedings of symposia sponsored by the Solidification Committee of the Materials Design and Manufacturing Division of TMS, held at the TMS Fall Meeting in Indianapolis, Indiana, Sep. 15-18, 1997 and at the TMS Annual Meeting in San Antoino, Texas, Feb. 15-19, 1998 (163), pp. 389-399.
Dijksman, Ed. J. F. "Droplet Formation, in Design of Piezo Inkjet Print Heads," Weiheim, Germany: Wiley-VCH Verlag GmbH & Co. KGaA, 2018, pp. 75-165, doi:10.1002/9783527806874.ch3.
Cheng, Stewart Xu et al. "Producing molten metal droplets with a pneumatic droplet-on-demand generator" J. Mater. Process. Technol., vol. 159, No. 3, pp. 295-302, Feb. 2005, doi: 10.106/j.jmatprotec.2004.05.016.

* cited by examiner

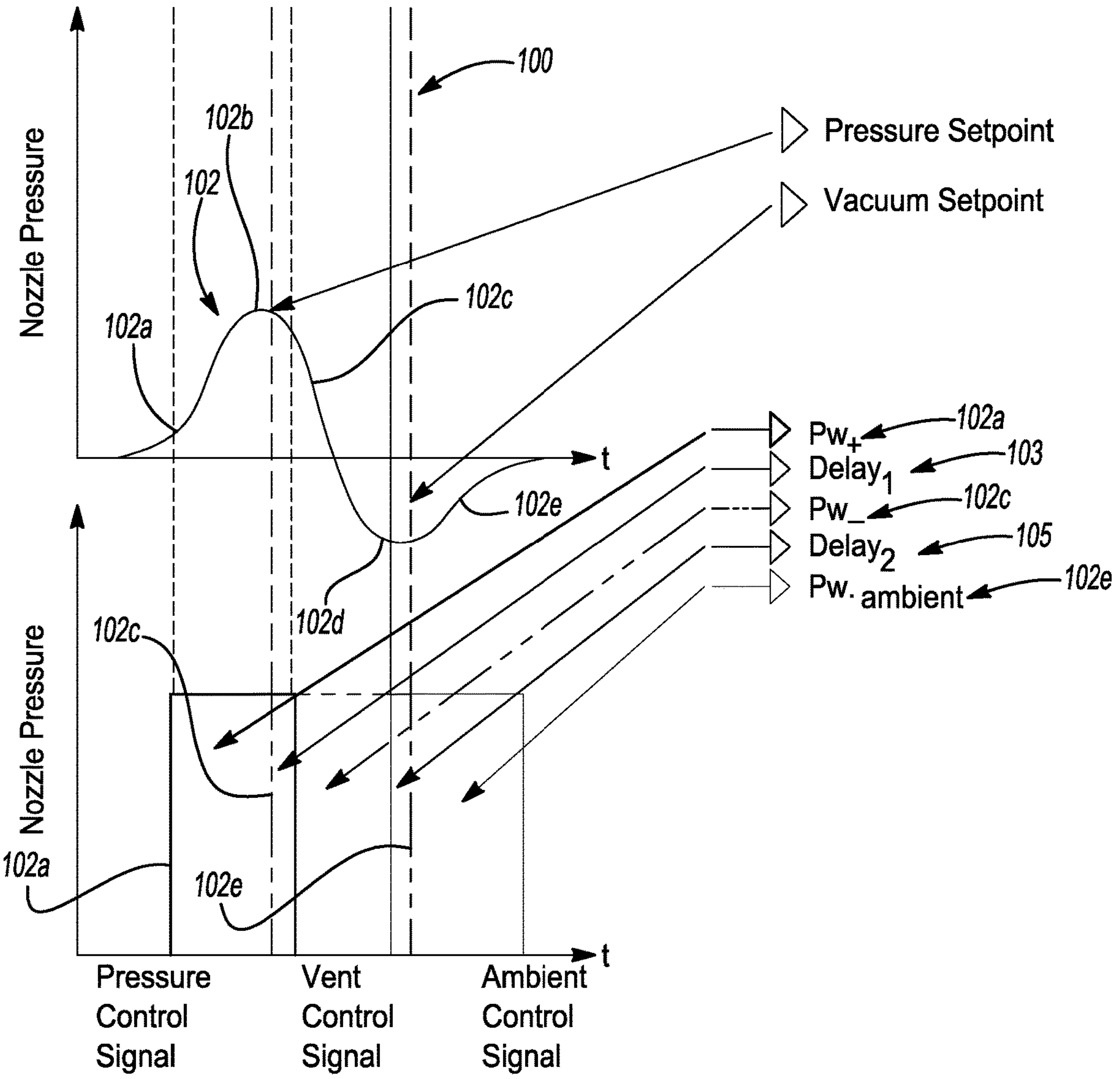
FIG. 1b
FIG. 1c
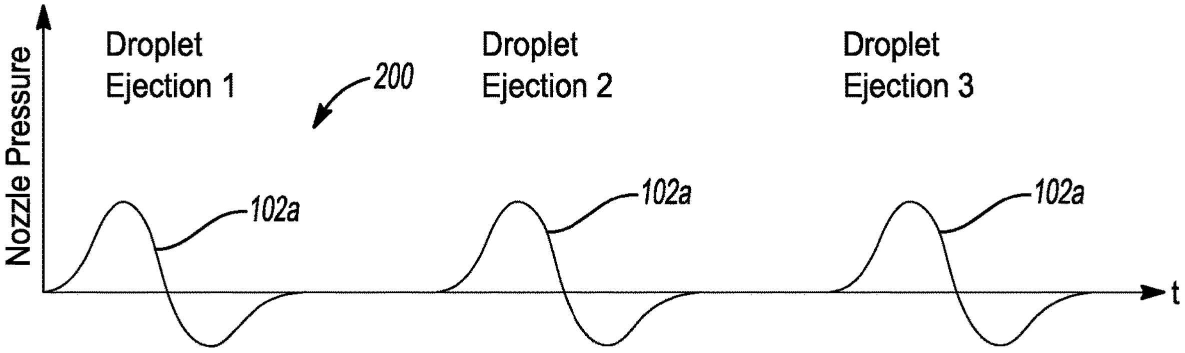
FIG. 1d

Valve: On/Off
Timing: Single Push
Pressure: Digital
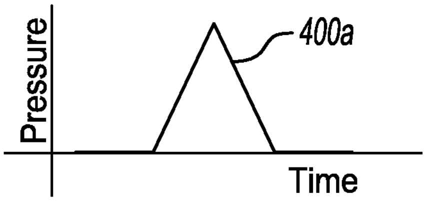
FIG. 4a
Valve: On/Off
Timing: Push-Pull
Pressure: Digital
FIG. 4b
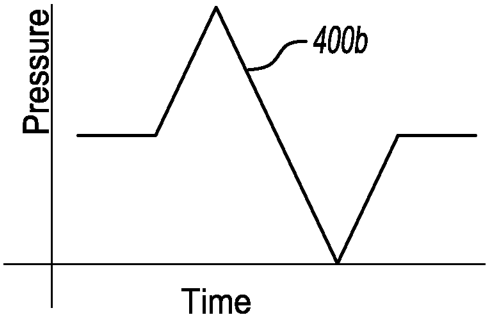
Valve: On/Off
Timing: Arbitrary
Pressure: Digital
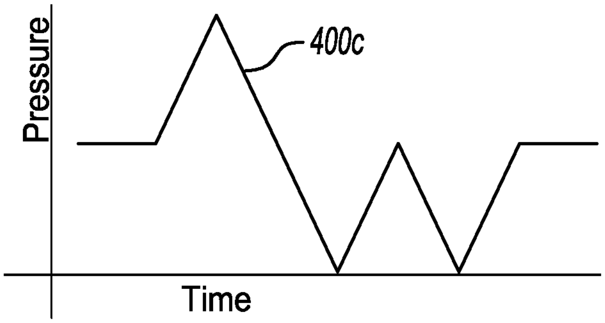
FIG. 4c
Valve: Proportional
Timing: Arbitrary
Pressure: Continuous
FIG. 4d
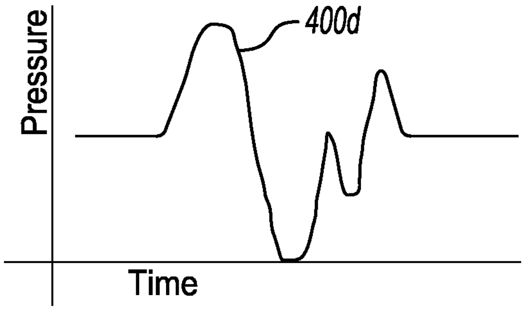

SYSTEMS AND METHODS FOR IMPROVED LIQUID DROPLET EJECTION FROM A GAS PRESSURIZED PRINTHEAD VIA ARBITRARY PRESSURE AND VACUUM PULSED WAVEFORMS

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems and methods for additive manufacturing using a pneumatic droplet-based additive manufacturing of parts, and more particularly to new systems and methods for "push-pull", "push" and arbitrary variations of these pulse control techniques, to form liquid droplets of desired dimensions, which can be used to make parts through a droplet-based process which has the potential to significantly improve resolution and part quality over prior pneumatic droplet-based processes.

BACKGROUND

The statements in this section merely provide background information related to the present disclosure and may not constitute prior art.

Over the past two decades, metal additive manufacturing (AM) has demonstrated several advantages over conventional manufacturing methods: faster turn-around for new designs, less expense, higher part performance, and unmatched design freedom. Laser powder bed fusion (LPBF) has been the most dominant metal AM technique to date in terms of industrial and research activity, but nevertheless suffers from various drawbacks such as expensive and limited feedstock choices, the extra burden imposed from feedstock handling and safety, large heat-affected zones (i.e., several previous layers are remelted for each pass of the laser), high residual stress in the printed parts, incompatibility with traditional alloy systems, and inability to print closed cell structures without trapping powder.

Droplet-based AM techniques offer an alternative way of printing metal parts. In addition to being compatible with a wide range of input materials (not limited to metals), droplet-based AM may provide a solution to these above-mentioned weaknesses of LPBF. Generally, two droplet-based AM methods exist: droplet-on-demand material jetting (DoD-MJ), and continuous jet (CJ) printing. Both methods saw initial development in inkjetting for image printing, but have since been expanded to include printing of polymers, binders, wax, tissues and metals. The system described here can eject droplets with both DoD and a CJ methods, with the help of a unique valving system. In DoD, a sharp momentum pulse is applied to a volume of molten material, which then jets through a nozzle to create a controlled stream of individual droplets. Under optimized conditions, each momentum pulse results in a discrete molten material droplet that rapidly cools and solidifies upon impact with the substrate or existing parts. Re-melting of surrounding material at the impact location of the droplet ensures a fully solid part.

Droplets can range in diameter from 10 μm to over 1 mm (depending mostly on the nozzle diameter), and have been shown to be deposited at frequencies of up to 2 kHz (2000 droplets per second), enabling rapid fabrication of parts that are comprised of potentially hundreds of millions of fused droplets. Compared to LPBF, this powderless metal AM technique provides more freedom in feedstock choice without the burden of powder handling, produces parts more rapidly, can fabricate closed cell architectures, handles traditional alloy systems, does not create high residual stress, and can be fine-tuned to ensure only a portion of the previous layer is remelted.

There are generally three DoD actuation methods to energize the molten feedstock and generate droplets: rod-connected piezo, electromagnetic (e.g., magnetohydrodynamic (MHD)) and pneumatic. The rod-connected piezo and MHD methods have recently been developed into commercially available metal AM printers by GROB GMP300 and Xerox ElemX™, respectively. Both the piezo and electromagnetic methods each have their limitations that the current disclosure addresses. The MHD system can print highly electrically conductive fluids like molten metals and alloys, but cannot print fluids that have lower electrical conductivities like molten salts, high temperature resins, or slurries of refractory/ceramic particles. The new pneumatic method described in the present disclosure can be used to generate droplets regardless of the fluid electrical conductivity. The actuation mechanism of the piezo rod technique requires the rod to be in direct contact with the molten material, which may react with the feedstock. In contrast, the new pneumatic method described in the present disclosure allows only the inert argon headspace to interact with the molten material, eliminating any possibility of adverse reaction or actuator degradation. In addition, like the MHD system referenced above, the new pneumatic method described in the present disclosure has the additional ability to create a complex pressure waveform that allows highly improved control of droplet size, formation, and velocity.

Although the pulse time scale of the piezo rod method can be faster than the new pneumatic method described in the present disclosure, the inertia of the rod reduces the ability to create complex pulsed waveforms, resulting in less control over droplet generation than both the MHD and the new pneumatic method described herein. In addition, the new pneumatic method described herein can operate under constant pressure to jet a constant stream of molten material at a mass flow rate hundreds of times larger than that of both the MHD and piezo methods. Neither of the other two methods are able to switch between pure DoD and (CJ) techniques within the same printhead.

SUMMARY

This section provides a general summary of the disclosure, and is not a comprehensive disclosure of its full scope or all of its features.

In one aspect the present disclosure relates to a droplet-based printing system that uses droplet on demand or continuous jetting. The system may comprise a controller and a printhead system. The printhead system has a housing with an internal cavity and a nozzle at a lower end thereof. The internal cavity is configured to hold a quantity of liquid therein. The printhead system also has a feedstock infeed port in communication with the internal cavity for enabling a feedstock to be fed into the internal cavity. The feedstock is contained within the internal cavity as a liquid feedstock. The printhead system also includes a valve system in communication with the controller and configured to selectively generate positive gauge pressure to the internal cavity in response to control signals received from the controller, to apply a vacuum negative gauge pressure to the internal cavity, and to further modify a pressure level within the internal cavity to create a pressure pulse with characteristics tailored to the rheological and thermal characteristics of the liquid feedstock, which causes ejection of a liquid droplet from the nozzle.

In another aspect the present disclosure relates to a system for droplet on demand printing. The system may comprise a controller; a printhead system having a housing with an internal cavity and a nozzle at a lower end thereof. The internal cavity configured to hold a quantity of molten metal therein. The housing includes a feedstock infeed port in communication with the internal cavity for enabling a metal feedstock to be fed into the internal cavity; an outflow/vacuum port in communication with the internal cavity for applying a controlled vacuum to the internal cavity; an ambient/offset port in communication with the internal cavity for venting the internal cavity to an ambient environment or to another environment with an offset pressure; and an inflow/pressure port for receiving a pressurized fluid signal for controllably pressurizing the internal cavity. The printhead system also contains a valve system including an outflow/vacuum valve in communication with the controller and with the outflow/vacuum port, and configured to enable a controlled vacuum to be applied to the internal cavity, an ambient/offset valve in communication with the controller and with the ambient/offset port, and configured to enable the internal cavity to be vented to the ambient environment when the ambient/offset valve is at least partially opened; and an inflow/pressure valve in communication with the controller and with the inflow/pressure port, and configured to enable a pressurized fluid to be channeled into the internal cavity. The outflow/vacuum valve, the ambient/offset valve and the inflow/pressure valve are controlled sequentially by the controller to generate a plurality of pulses each having a predetermined pulse configuration for generating a molten metal droplet having a desired dimension and velocity.

In still another aspect the present disclosure relates to a printhead for use in a droplet on demand (DoD) printing system. The printhead comprises a housing with an internal cavity and a nozzle at a lower end thereof. The internal cavity is configured to hold a quantity of molten feedstock material therein. The printhead also comprises a feedstock infeed port in communication with the internal cavity for enabling a feedstock material to be fed into the internal cavity and contained as a liquid feedstock material. The printhead also includes a first port in communication with the internal cavity for enabling a vacuum to be applied to the internal cavity; a second port in communication with the internal cavity for venting the internal cavity to an ambient environment; and a third port in communication with the internal cavity for enabling pressure to be applied to the internal cavity to pressurize the internal cavity. The printhead further includes a valve system in communication with the first, second and third ports, to enable a controlled sequence of application of a positive gauge pressure to the internal cavity; an application of a negative gauge pressure to the internal cavity; and venting of the internal cavity to atmosphere. The housing of the printhead also includes a nozzle in communication with the internal cavity for ejecting a molten metal droplet therefrom.

In still another aspect the present disclosure relates to a method for droplet on demand printing. The method may comprise using a printhead having a housing with an internal cavity to contain a quantity of liquid feedstock therein. The method may further comprise controlling a pressurization within the internal cavity by applying a vacuum to the internal cavity, venting the internal cavity, and applying a positive gauge pressure to the internal cavity, in a controlled sequential fashion, to create a pressure pulse. The pressure pulse time and amplitude signatures are tailored to the rheological and thermal characteristics of the liquid feedstock, and causes ejection of a liquid droplet from a nozzle of the housing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 1*b* shows a pair of graphs illustrating one example of a “push-pull” waveform created using the system of FIG. 1*a*, and the electronic drive signals for the pressure, vent, and ambient valves that are used to create the push-pull pressure waveform;

FIG. 1*c* shows a diagram illustrating a sequence of operations and timing configurations that are used to create the pressure pulses of FIG. 1*d;*

FIG. 1*d* shows a graph illustrating nozzle pressure versus time for a series of droplet ejection pulses;

FIG. 4*a* illustrates a graph of a single digital push pressure waveform that can be created using the systems and methods of the present disclosure;

FIG. 4*b* illustrates a graph of a digital push-pull pressure waveform that can be created using the systems and methods of the present disclosure;

FIG. 4*c* is a graph of an arbitrary digital push-pull pressure waveform having more than two digital peaks that can be created using the systems and methods of the present disclosure; and FIG. 4*d* is an example of an arbitrary continuous pressure waveform that can be created using the systems and methods of the present disclosure. The hypothetical pressure waveform in 4*d* can be created using a valving mechanism that allows more precise control over the opening and closing of the valve, e.g., a proportional valve.

DETAILED DESCRIPTION

Figure 1A:
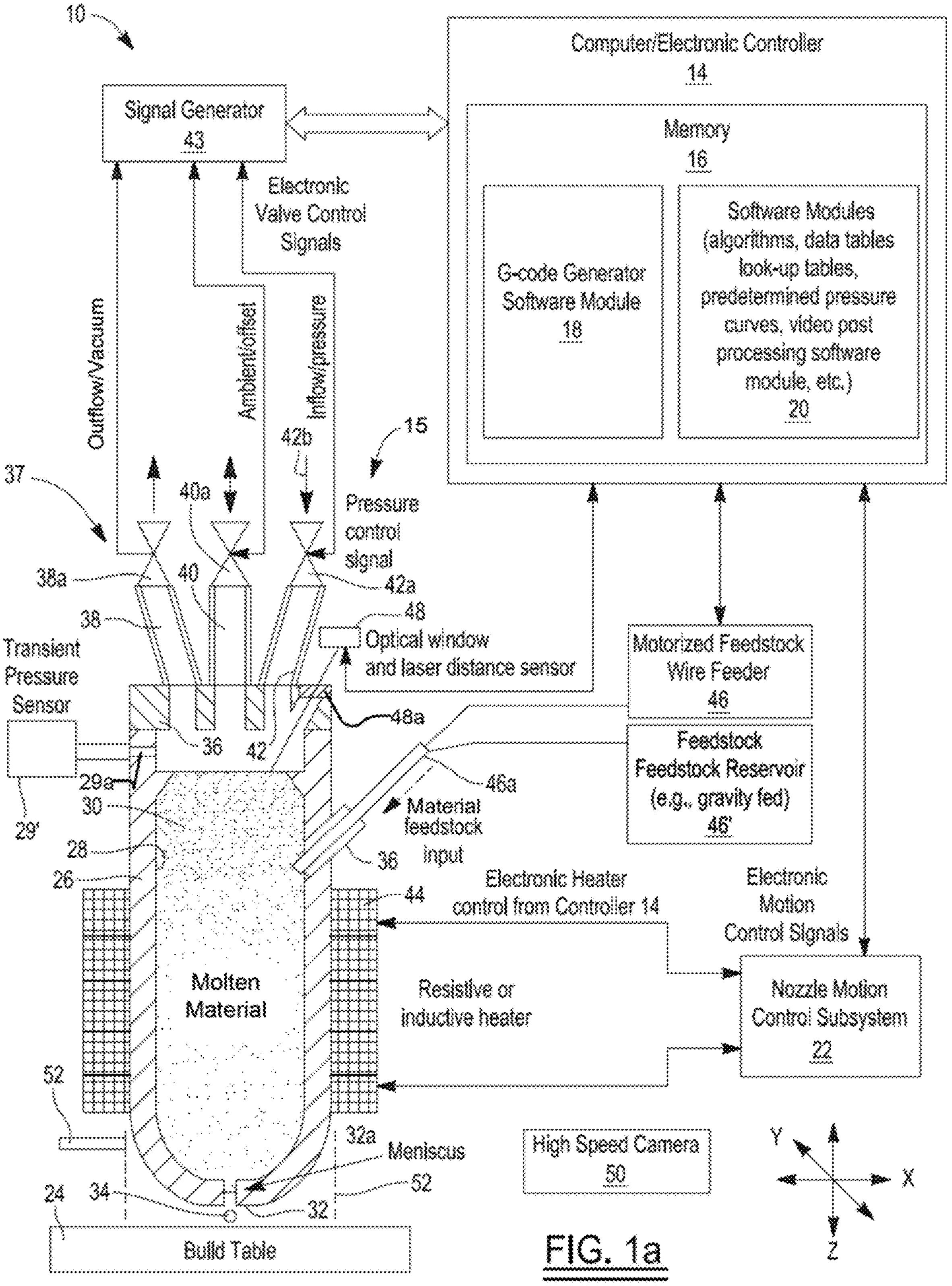
FIG. 1*a* is a high-level block diagram of one embodiment of a system in accordance with the present disclosure showing several optional components as well.

Example embodiments will now be described more fully with reference to the accompanying drawings.

The present disclosure relates to new systems and methods for pneumatic droplet-based additive manufacturing, which includes "Droplet-on-Demand Material Jetting" ("DoD-MJ" or alternatively "DoD") and "Continuous Material Jetting" ("C-MJ" or alternatively "CJ"). With the systems and methods disclosed herein a reservoir is filled with a liquid such as molten pure metal or a metal alloy. The molten pure metal or metal alloy is maintained in liquid form via a heating device. A reservoir of inert gas such as argon or nitrogen is maintained in direct fluid contact with the liquid reservoir. The gas reservoir is then connected to an inert gas pressure source, such as a compressor or a pressurized gas bottle. Electronically controlled valves control the rate and timing of gas flow in and out of the gas reservoir. In DoD, by rapidly opening and closing the valves, a sequence of rapid inflow and exhaust of inert gas into and out of a gas reservoir creates a momentum pulse that displaces liquid volume in the reservoir and causes the denser liquid within the reservoir to pressurize and begin to flow out of the nozzle at the bottom of the reservoir. After the gas reservoir is pressurized, the pressure valve is then quickly shut off while a second valve (operating out of phase with the pressure valve) opens to evacuate the pressurized gas out of the chamber to atmosphere. This allows a portion of the partially ejected liquid mass to naturally retract back into the nozzle, allowing the remaining portion, which forms a disconnected droplet, to travel away from the nozzle on its own momentum. This is also known as "droplet breakup" or "droplet pinch-off" in literature. The usage of this rapid pressurization with the pressure valve and subsequent depressurization to ambient with a second valve may be viewed as "push-only" actuation. As found in all DoD methods, this gives freedom to deposit an isolated droplet with a single pulse or use a series of pulses to repeatedly eject droplets at rates up to a few kilohertz.

It should be noted that in literature, the DoD method is distinct from the CJ method through the nature of the pressure source: in DoD, the pressure source is pulsed; that is, the pressure peaks are separated with little to no pressure. In CJ, the pressure source is nearly constant, but with some slight local perturbations to facilitate droplet breakup from the jet. The present disclosure relates to MJ systems and methods where (1) either individual pressure pulses result in individual droplet ejections (i.e., DoD) or (2) a constant positive gauge pressure is applied to create a continuous jet of metal that is controllably broken up with periodic vacuum pulses (i.e., CJ). In some embodiments, the system 10 can adopt one or the other method without even changing hardware components, however the focus in the following paragraphs will be on describing the DoD version merely for simplicity.

In DoD AM, if the pressure pulse energy is weaker than the surface energy of the liquid meniscus within the nozzle, the extruded liquid mass naturally retracts back into the nozzle, oscillates, and no droplet is formed. If the pressure pulse is significantly stronger than the surface energy, the ejected mass will start to eject in a liquid column and then naturally break up into multiple droplets, or create droplets much larger than the nozzle ID, which is generally undesirable in DoD. A significant effort in DoD is avoiding both scenarios by choosing the correct combination of pressurization, nozzle design, and printhead design.

Control over droplet ejection, breakup and detachment from the nozzle, as well as the resulting meniscus behavior are critical to the performance of a DoD printhead, and thus any meaningful pressure waveform improvements can be expected to lead to a large range of practical performance improvements. It will be that the term "meniscus" as used herein is meant to be the point of demarcation where the fluid ends and the gas (or atmosphere) begins.

The present disclosure describes novel AM systems and methods which dramatically improve upon the aforementioned "push-only" pneumatic DoD printhead design. By creating an arbitrary waveform actuator that is able to create highly controlled "push-pull" or arbitrary, non-push-only pressure signatures, greater control over droplet breakup can be achieved, resulting in a more stable, consistent, and higher quality droplet jetting performance.

Referring FIG. 1*a*, a system 10 in accordance with one embodiment of the present disclosure is shown. In this example the system 10 includes a computer/electronic controller 12 (hereinafter simply "controller" 12), and a printhead system 14. The controller 12 may also include a non-volatile memory 16 (e.g., both volatile and non-volatile RAM, ROM, EPROM, EEPROM, DRAM, etc.) for storing a G-code generator module 18 and one or more software modules 20 for algorithms, data tables, look-up tables, predetermined performance pressure curves, etc., that may be helpful or needed in carrying out an AM printing operation. A printhead motion control subsystem 22 (e.g., DC stepper motors, linear actuators, etc.) may also be included which receives electronic motion control signals from the controller 12 to move the printhead system 14 along X, Y and/or Z axes of movement. Optionally, the printhead motion control subsystem 22 may be substituted for a build table motion control subsystem (e.g., XYZ stage) to move a build table 24 rather than the printhead system 14. Both applications are envisioned by the present disclosure. The build table may be heated to improve inter-droplet bonding and part performance.

Referring further to FIG. 1*a*, the printhead system 14 in this example includes a housing 26 (e.g., stainless steel) having an internal chamber 28 for holding molten material 30 and a nozzle 32 through which molten metal contained in the internal chamber 28 may be discharged as molten metal droplets 34 during a printing operation. A pressure sensor 29 may be included which communicates with the internal chamber 28 through a port 29*a* and transmits a signal to the controller 14 to provide feedback on pressure pulse shape and pressurization dynamics of the internal chamber 28.

A small portion of the molten material which resides within the nozzle 32 is termed a "meniscus", and is indicated by reference number 32*a*. The housing also includes a port 36 in communication with the internal chamber 28 for receiving a metal feedstock (e.g., and without limitation, a powdered metal, metal chunks, a metal wire, etc.) from a feedstock reservoir. In one example the feedstock reservoir is formed by a motorized feedstock wire feeder 46. However, in other embodiments the feedstock reservoir may simply be a reservoir 46' which holds a quantity of metal material either in powdered form or chunk form, or in some other form, and which feeds the feedstock by gravity into the port 36. The present disclosure is not limited to metal feedstock in any particular shape, form or configuration.

With further reference to FIG. 1*a*, an upper region 38 of the housing 26 includes a vent port 38, an ambient and/or offset (i.e., ambient/offset) port 40 and an inflow/pressure port 42. An electronically controlled vent valve 38*a* in communication with the controller 12 and with the vent port 38 controls venting of the internal chamber 28 when opened. An ambient/offset electronically controlled valve 40*a* further in communication with the controller 12 and the ambient/offset port 40 assists in venting the internal chamber 30. An inflow (hereinafter "inflow/pressure") valve 42*a* (e.g., proportionally actuated solenoid valve) in communication with the controller 12 and the inflow/pressure port 42 receives electronic control signals from the controller and enables a highly controlled pressurized fluid 42*b* (e.g., air, argon) to be admitted into the internal chamber 28 to controllably pressurize the internal chamber. Collectively, the valves 38*a*, 40*a* and 42*a* may be viewed as a valve system 37.

The printhead system 15 also includes a heater subsystem 44 which in some embodiments may be a resistive heater, and in other embodiments may be an inductive heater. Still further types of heaters may be employed such as laser, chemical, combustion, and heat guns. The heater subsystem 44 in this example circumscribes the exterior of the housing 26 and receives electronic heater control signals from the controller 12. The heater subsystem 44 generates sufficient heat to fully melt the metal feedstock to turn it into the molten metal 30.

Referring further to FIG. 1*a*, the system 10 may also optionally incorporate a signal generator 43 for controlling actuation of the valves 38*a*, 40*a* and 42*a*. The high-speed camera 50 is not required for operation, but optionally can be used as a diagnostic component to monitor droplet formation and extract droplet ejection parameters using custom video post-processing software stored in the software modules 20.

In the case of imaging molten metal ejections, the printhead housing 28 may be inserted into a transparent vessel or sheath 52 (e.g., an Ar gas sheath) that is properly flooded with Ar gas (verified with an oxygen sensor) to reduce the effects of metal droplet oxidation. In practice, the printhead system 14 may be entirely housed inside an inert glove box or chamber to ensure no oxidation at the nozzle or along the droplet trajectory. Alternately, the printhead system 14 may contain gas flow channels around and near the jetting nozzle to create a sheath of inert gas to reduce oxidation effects. If oxide is less of a concern for a particular material or liquid metal, the printhead system 14 can be operated in air.

Figure 1E:
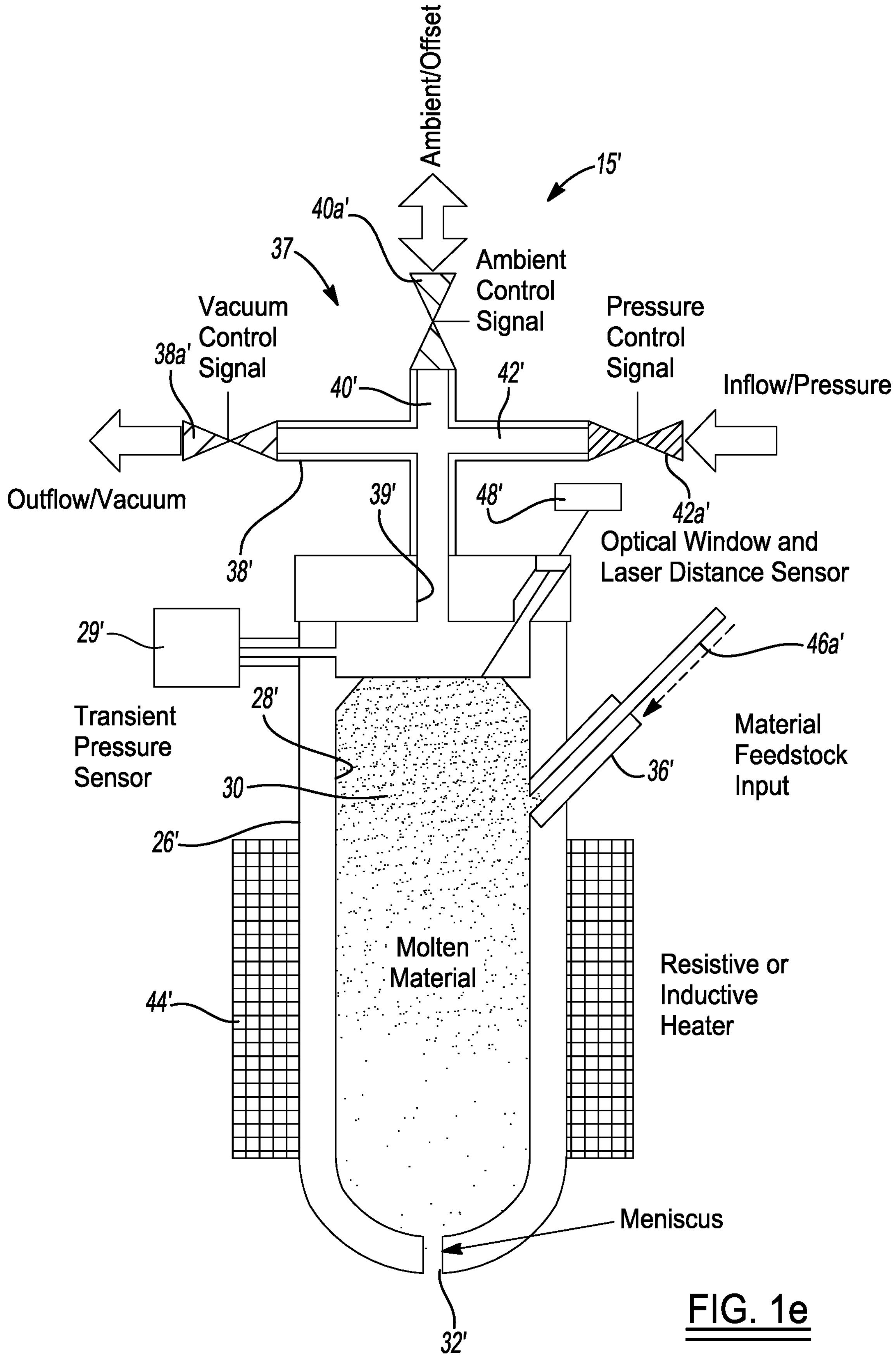
FIG. 1*e* shows another embodiment of the printhead system in accordance with the present disclosure in which a valve system communicates with only a single inlet port to control pressure within the internal chamber.

In another embodiment the printhead system 14 may include only a single port in communication with a set of valves via tubing, as illustrated in FIG. 1*e*.

FIG. 1*b* shows a graph 100 illustrating how the three valves 38*a*, 40*a* and 42*a* operate in sequence to control pressurization and venting of the internal chamber 28. Curve 102 includes portion 102*a* where the internal chamber 28 is pressurized by the application of a fluid pressure (e.g., air, argon, nitrogen, other immiscible fluid, etc.) via valve 42*a* and through the inflow/pressure port 42. During this phase the valves 38*a* and 40*a* are both closed. Pressure within the internal chamber 28 builds to a maximum predetermined pressure at point 102*b*. Next the inflow/pressure valve 42*b* is closed and the internal chamber 28 is then evacuated via a vacuum created when the outflow/vacuum valve 38*a* is opened. Pressure within the internal chamber 28 drops rapidly as indicated by portion 102*c* of curve 102. This evacuates the internal chamber 28 via the just created vacuum which the internal chamber 28 is exposed to and creates a temporary negative pressure within the internal chamber as indicated by point 102*d* on the curve 102. Finally, the outflow/vacuum valve 38*a* is closed and the internal chamber 28 is returned back to atmosphere pressure by opening the ambient/offset valve 40*b*, as indicated by portion 102*e* of the curve 102. This last operation corrects for any long-term drift away from atmospheric reference.

FIGS. 1*b* and 1*c* show the eight pressure waveform adjustment parameters that the printhead system 16 has. The eight adjustment parameters include (1) pressure, (2) vacuum and (3) offset pressure setpoints; (4) on time of pressure/inflow valve, (5) on time of vacuum/outflow valve, (6) on time of ambient/offset valve; (7) delay timing between the pressure/inflow on time and the vacuum/outflow on time parameters; (8) delay timing between the vacuum/outflow and the ambient/offset on time. The portion of curve 102*a* is represented by "$pw^+$" followed by a first predetermined delay period 103 (e.g., delay of 0 to many times $pw^+$ seconds). The vacuum portion 102*c* of the curve 102 is represented by "$pw^-$", followed by a second predetermined time delay period 105 (e.g., delay of $pw^+$ to many times $pw^+$ seconds, or typically a few microseconds to several milliseconds). The atmospheric venting as indicated by portion of the curve 102*e* is then performed, which is represented by "$pw_{ambient}$".

FIG. 1*d* shows a waveform 200 illustrating that each pressure pulse 102*a*, regardless of its shape, corresponds to a single droplet ejection event. Optionally, an additional constant vacuum source can be connected to the ambient/offset port 40 (FIG. 1*a*) to prevent dripping of the fluid from the meniscus 32 due to hydrostatic pressure.

With brief reference to FIG. 1*e*, a printhead system 14' in accordance with another embodiment of the present disclosure is shown. Components in common with printhead system 15 are denoted with reference numbers having a prime (" ") designation. The printhead system 15' instead makes use of only a single port 39' with which the vent port 38', the ambient/offset port 40' and the inflow/pressure port 42 communicates. Valves 38*a*', 40*a*' and 42*a*' communicate with the ports 38', 40' and 42' respectively.

Figure 1F:
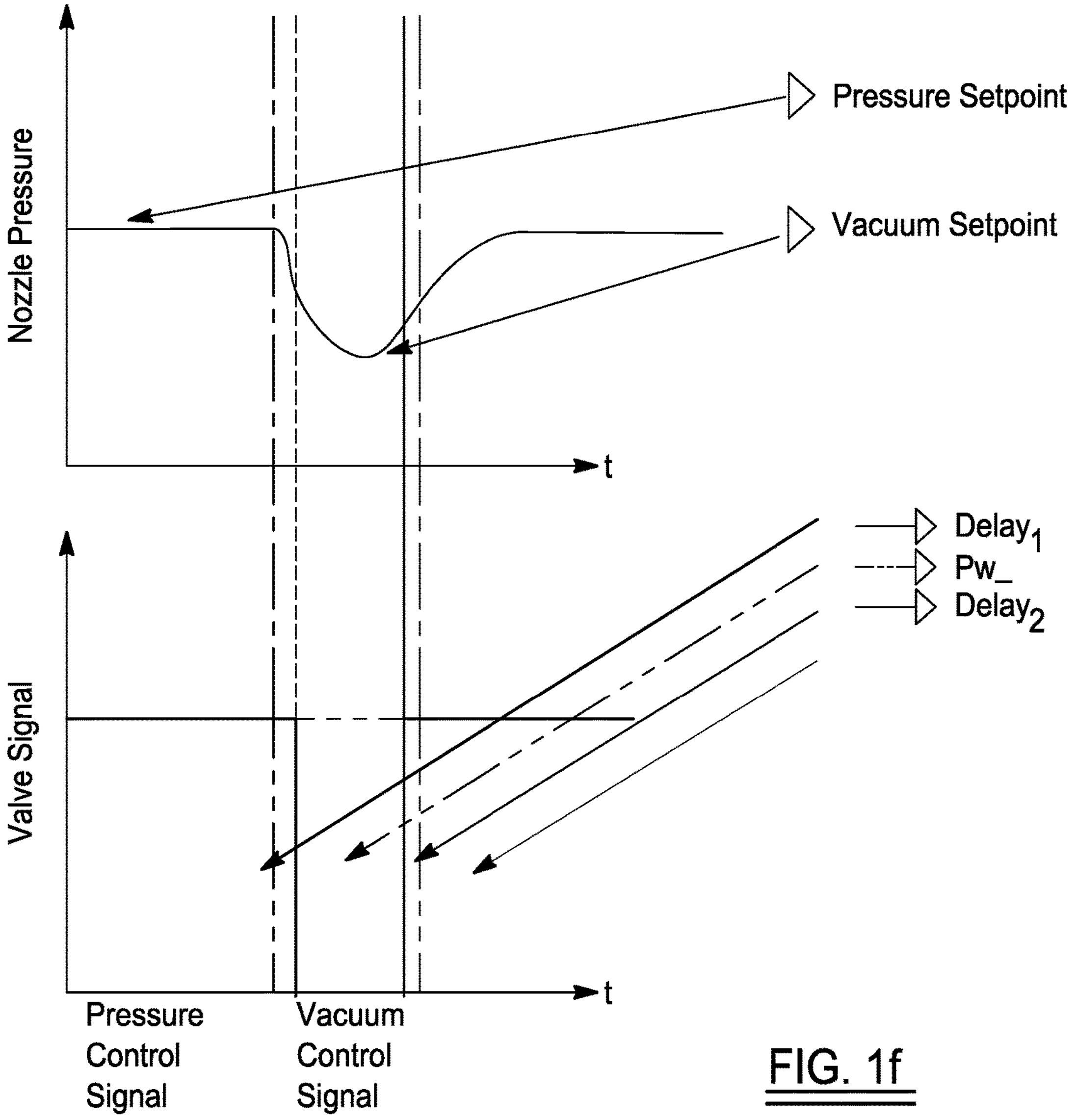
FIG. 1*f* shows a timing diagram illustrating how a continuous jetting operation using the system 10 can be carried out.
Figure 1G:
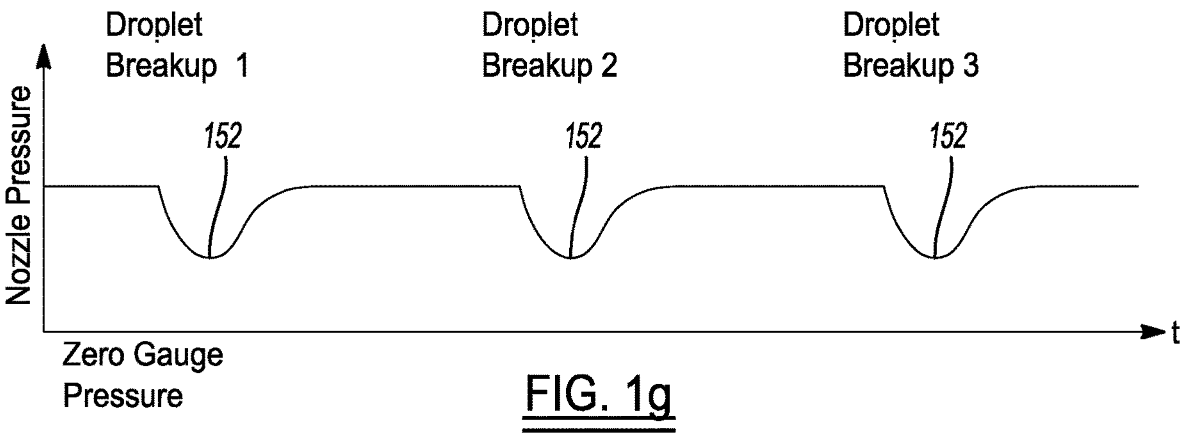
FIG. 1*g* shows a nozzle pressure vs. time graph associated with the continuous jetting operation of FIG. 1*f*, to illustrate when droplet breakup will occur in response to controlled, short term drops in nozzle pressure.

FIG. 1*f* shows a timing diagram 150 illustrating how a continuous jetting operation using the system 10 can be carried out. By "continuous jetting" it is meant pressure and vacuum control signals applied by the signal generator 43, separated by controlled time delays, that cause a continuous jet (i.e., stream) of feedstock material 30 to be ejected from the printhead system 15 which breaks up into droplets after leaving the printhead system, but before reaching the surface of the build table 24, or before reaching a previously formed layer on the build table. FIG. 1*g* shows a graph of nozzle pressure versus time illustrating three time periods where controlled momentary drops 152 in nozzle pressure 152 will produce droplet breakup.

A major benefit of this advancement is that the pressurized gas within the internal chamber 28 is evacuated much more rapidly, generating a faster pressure response and with significantly finer temporal control of droplet generation dynamics. This form of "push-pull" actuation can create even sharper pulses in time that, combined with higher pressure, creates droplets with significantly higher velocity than what the "push-only" printheads can create. This higher velocity is necessary to provide enough kinetic energy to flatten the droplets upon impact before solidifying to create flatter and denser layers of material. The finer temporal control of the pressure shown in FIG. 1*a* waveform also permits the printhead system 16 to be fine-tuned to match breakup timing time at the nozzle meniscus 32*a*, which depends on nozzle ID, and the fluid's density and surface tension. Matching this timescale produces not only satellite-free droplets, but also ones that have diameters that are close to that of the nozzle 32 ID. The printhead system 16 design and the control operations described herein take advantage of these benefits to create parts with even higher resolution and higher quality than "push-only" printheads. For example, the pneumatic printhead system 16 and related control methods described herein can create a "push-pull" waveform to generate water droplets that are 1.2 times the nozzle ID. In contrast, it has been shown that "push-only" printheads can only print droplets between two to four times the nozzle ID, which considerably reduces part resolution compared to "push-pull" pneumatic printheads.

Another major benefit of the printhead system 16 described herein along with its method of control printhead is that the gas-filled space above the molten metal can reach vacuum levels (negative gauge pressure), which actively pulls the meniscus 32*a* back into the nozzle 32 during droplet breakup. This facilitates droplet breakup closer to the nozzle 32 location, which reduces the oscillation of the meniscus 32*a* before the next droplet is ejected. In DoD jetting, the oscillation of the meniscus 32*a* puts a serious practical limit on the maximum droplet jetting rate/frequency, since the meniscus must be nearly motionless before the next ejection. Attempting to eject droplets before the meniscus is fully quiesced creates an uncontrollable inconsistency in droplet velocity, size and directionality. The system 10 and methods described herein enable pneumatically actuated droplets to break up closer to the nozzle 32, reducing meniscus 32*a* oscillations and allowing for a higher max ejection frequency (and thus a higher deposition rate).

Referring further to FIG. 1, the system 10 in some embodiments is designed to maintain a constant fill level by feeding feedstock material into the internal chamber 28 through the feedstock input port 36 from a feedstock material reservoir (not shown). FIG. 1*a* shows one example of a feeding system where a feedstock material in the form of a wire 46*a* is fed into the molten material (i.e., liquid) 30 within the internal chamber 28, and almost immediately becomes molten as needed. A predetermined level of molten material 30 is maintained using a feedback system that includes, in some embodiments a level sensing component, and in some embodiments a laser level sensor 48. In this example, the laser level sensor 48 projects a laser beam through an optical peep hole window 48*a* in the housing 26 to the upper surface of the molten feedstock 30. The motorized feeder 46 is used to feed in the wire at a predetermined feed rate, which in some embodiments may be fixed, and in other embodiments may be variable and controlled by the controller 14. In some embodiments both the laser level sensor 48 and the motorized feeder 46 may be in bi-directional communication with the controller 14 and thus monitored and/or controlled by the controller. The feedstock material can be wire or rod fed, batch delivery (e.g., put metal pieces into crucible, seal, and heat up), solid feed of small pieces via hopper, or feed molten metal directly into the crucible using suitable valving.

Figure 2A:
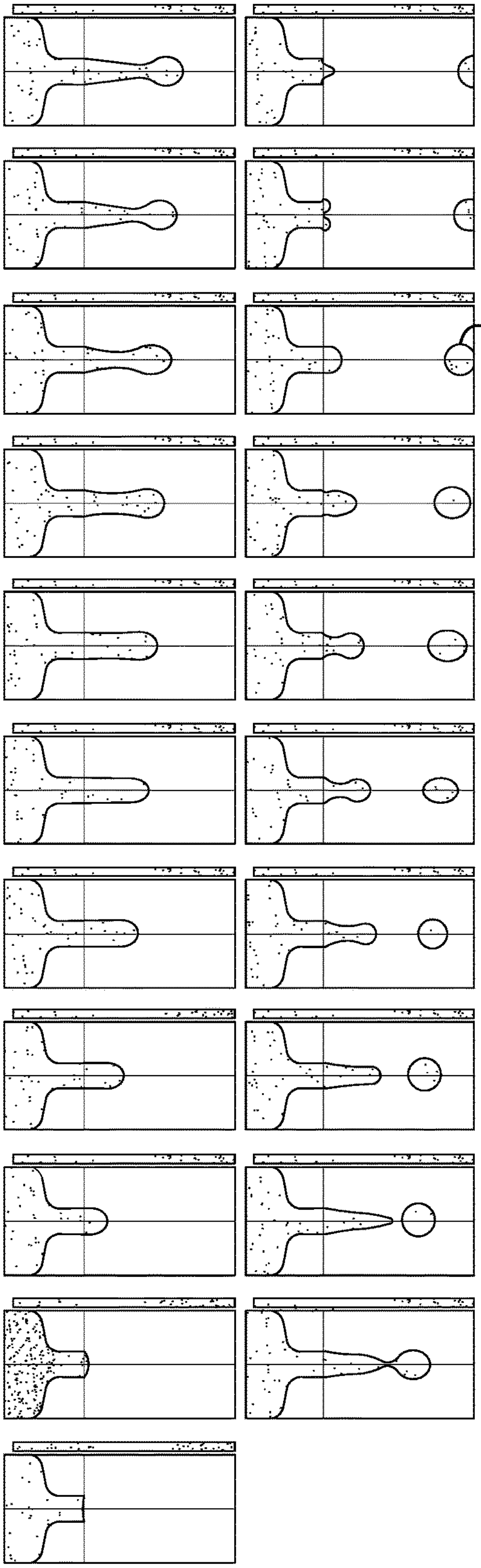
FIG. 2a (Prior Art)
FIG. 2*a* is a series of time-based illustrations (in steps of 100 μs), showing a physics-based simulation of how a prior art “push” method of forming droplets in a DoD system creates droplets which are larger than the nozzle internal diameter (ID). In addition, the droplet breaks up far away from the nozzle, leaving a hanging liquid thread that will create unwanted perturbation of the meniscus; finally, the breakup time is longer, limiting the ejection rate (droplets per second) of this waveform.
Figure 2B:
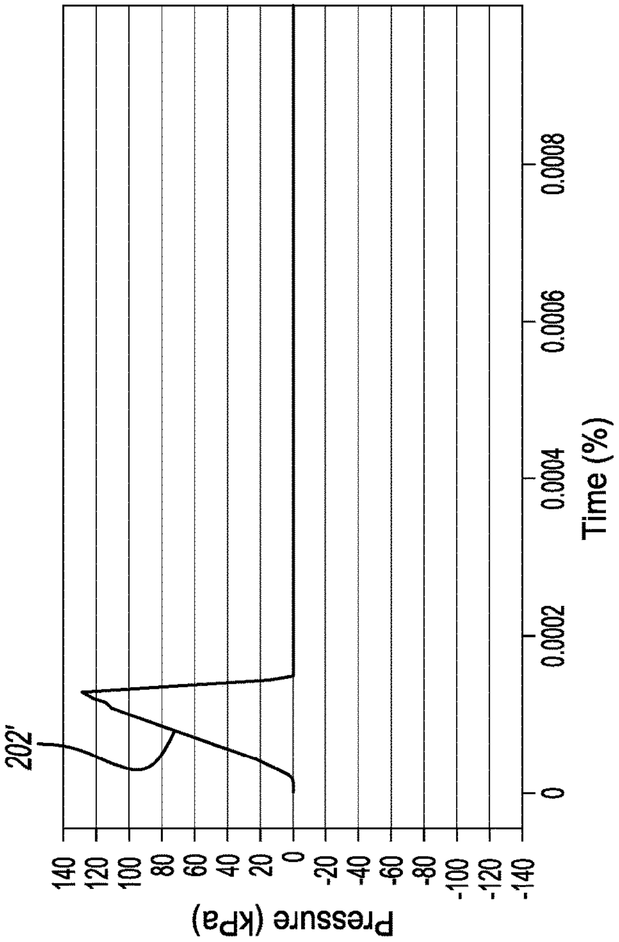
FIG. 2b (Prior Art)
FIG. 2*b* is a graph showing a prior art “push” pressure pulse that created the droplet shown in FIG. 2*a;*
Figure 2C:
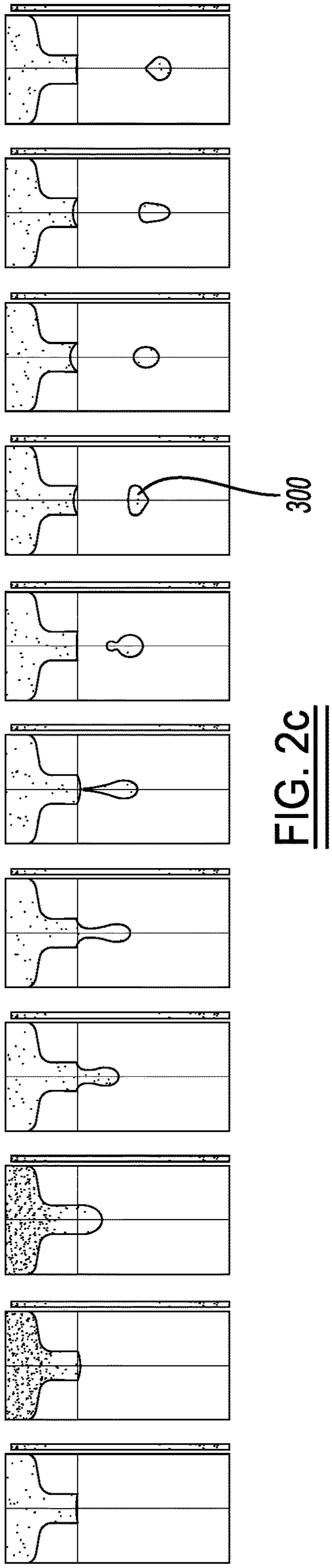
FIG. 2*c* is an illustration showing a series of simulations to depict how a reduced size droplet may be formed using the system of FIG. 1*a* and a push-pull pressure waveform; here, the droplet is smaller than the nozzle ID, the droplet breaks up close to the orifice, and the breakup time is shorter, improving the ejection rate (droplets per second) of this waveform.
Figure 2D:
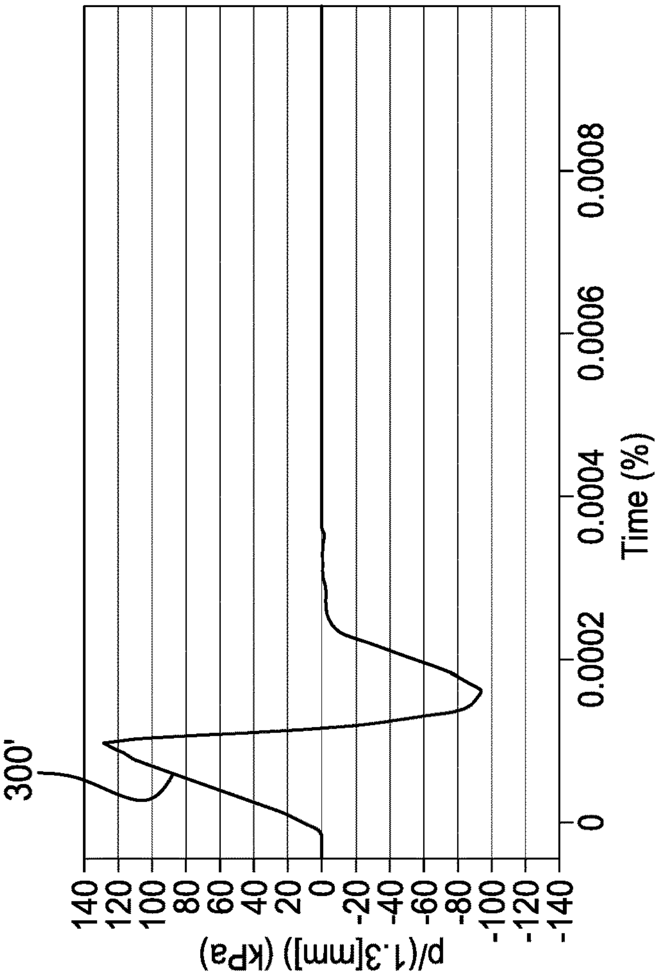
FIG. 2*d* is a graph of the push-pull waveform used to create the droplet shown in FIG. 2*c;*

FIGS. 2*a*/2*b* and 2*c*/2*d* demonstrate the difference between a "push-only" and a "push-pull" ejection of a molten aluminum droplet, simulated using the computational fluid dynamics software COMSOL Multiphysics 5.6. The simulation involves ejection of molten aluminum out of a 500 μm nozzle ID in steps of 100 μs. The ejection shown in FIG. 2(*a*) creates a droplet 202 that is large relative to the nozzle ID, low velocity, and takes a relatively long time to detach from the nozzle. The pulse 202' creating the droplet 202 is illustrated in FIG. 2*b*. In contrast, FIG. 2(*b*) shows the same fluid, with a "push-pull" waveform created in accordance with the system 10. The resulting droplet 300 in FIG. 2*c* is created more quickly, is faster, and smaller in size. The profile of the pulse 300' used to create the droplet 300 is shown in FIG. 2*d*.

Figure 3A:
FIG. 3a (Prior Art)
FIG. 3*a* is a series of illustrations depicting an experimental pneumatic ejection of water out of an 800 μm nozzle ID in steps of 100 μs, using a push only positive pressure pulse, to further illustrate that the droplet created is significantly larger than the nozzle ID.
Figure 3B:
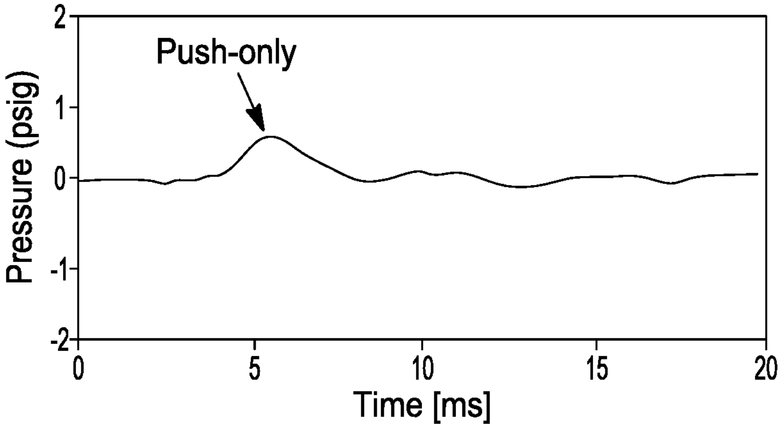
FIG. 3*b* is the corresponding positive pressure pulse above the top free surface of the water within the housing (28)
Figure 3C:
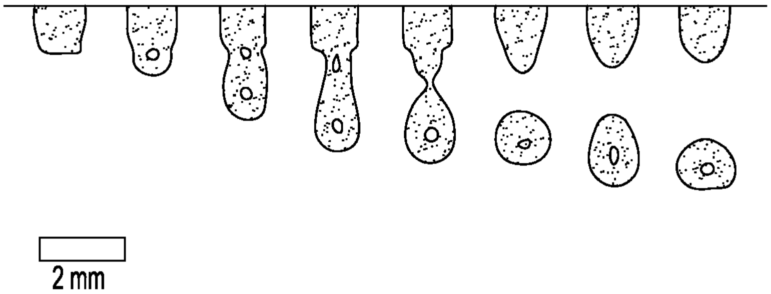
FIG. 3*c* is a series of illustration depicting an experimental pneumatic ejection of water out of an 800 μm ID nozzle in steps of 100 μs, using a push-pull pressure waveform, to further illustrate that the droplet created is significantly reduced in size (notice that the push-pull pressure pulse creates a smaller droplet more quickly in addition to a more retracted meniscus)
Figure 3D:
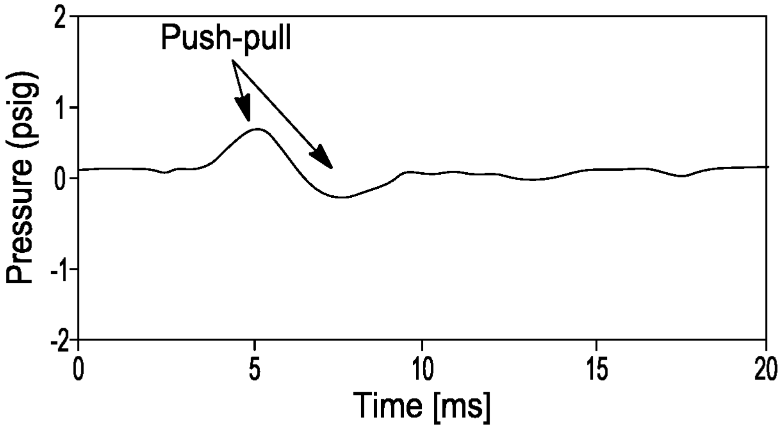
FIG. 3*d* is the corresponding positive-negative pressure pulse above the top surface of the liquid within the housing (28) used to create the droplet shown in FIG. 3*c;*

The system 10 in its various embodiments, as well as its methods of operation, are thus able to operate with individually controllable pressure and vacuum sources to achieve "push-pull" or other arbitrary pressure waveforms, or without vacuum source to create "push-only" waveforms. FIGS. 3*a*-3*d* illustrate the difference between "push-only" (FIGS. 3*a* and 3*b*) and "push-pull" (FIGS. 3*c* and 3*d*) ejections with water through an 800 μm nozzle ID, where each frame is a 100 us time step. FIG. 3*d* shows that the push-pull ejection shows that the system 10 and methods described herein creates smaller droplets, more rapidly (i.e., higher resolution, higher deposition rate) than the "push-only" method. In addition, the "pull" of the vacuum helps to significantly reduce the length of the meniscus after the droplet breaks off, ensuring meniscus quiescence before the next ejection and reducing the probability of the retracting meniscus breaking into multiple satellites.

Currently, the "push-pull" mode generates satellite-free water droplets at similar velocities to the "push-only" mode. Faster switching valves and/or optimized valve timing are needed to jet droplets at velocities that are considerably higher than with the "push-only" method. The current setup may be more amenable to printing fluids that break up more slowly (such as more viscous or denser fluids), enabling better control of droplet ejection velocity.

The invention described in this disclosure is not limited to printing molten metals and metal alloys, but can be used to jet any fluid with non-negligible surface tension. This includes, but is not limited to, ceramic/refractory or graphite suspensions or slurries, polymers or gels, organic solvents, or biological solutions (e.g., proteins, cells, etc.).

In addition, as FIGS. 4*a* and 4*b* illustrate that the system 10 and methods of the present disclosure are able to create digital pressure signatures which are not limited to "push-only" (FIG. 4*a*) or "push-pull" waveforms (FIGS. 4*b*) 400*a* and 400*b*, respectively. Any arbitrary sequence of positive and negative gauge pressure pulses can be employed to generate a desired molten fluid ejection event by varying the timing of each of the valves 38*a*, 40*a* and 42*a*. FIG. 4(*c*) illustrates a simple example of a digital waveform 400*c* using arbitrary timing to create a "push-pull-pull" sequence; a "pull-push" sequence could also be created to simulate a waveform that is commonly used in ink jetting. FIG. 4*d* illustrates any arbitrary waveform 400*d* that can be created if high-speed proportional valves are employed instead of simpler on/off valves. The proportional valves provide more precise control of pressure level at a particular moment since the valve aperture opening is proportional to the input voltage or current. This gives more control than the simpler on/off valves whose apertures cannot be held partially open, but simply transition from open to close or close to open-giving monolithic pulses with heights based on the pressure of the gas source. Proportional valves can be combined with additional control circuitry to replicate an arbitrary pressure waveform (FIG. 4*d*). Pressure pulse amplitudes can take on intermediate values between maximum and minimum gauge pressures. In this case, the gas-filled (e.g., Ar) volume in the printhead system 14 above the molten material on the build table 24 can be held at any arbitrary pressure between the vacuum and pressurized gas sources, as shown in FIG. 4(*d*). In some embodiments combination of both types of valves (on/off and proportional) may be used.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. As used herein, the term "about", when used immediately previous to a specific recited value, denotes the specific recited value as well as all values, inclusive, from +/−10% of the specific recited value.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for droplet-based printing comprising:

a controller;

a printhead system having:

- a housing with an internal cavity and a nozzle at a lower end thereof, the internal cavity configured to hold a quantity of liquid therein;
- a feedstock infeed port in communication with the internal cavity for enabling a feedstock to be fed into the internal cavity, the feedstock being contained within the internal cavity as a liquid feedstock; and
- a valve system in communication with the controller and configured to selectively generate a positive gauge pressure to the internal cavity in response to control signals received from the controller, to apply a vacuum negative gauge pressure to the internal cavity, and to further modify a pressure level within the internal cavity to create a pressure waveform with characteristics tailored to characteristics of the liquid feedstock and nozzle geometry, which causes ejection of a quantity of feedstock that at least one of:

produces a droplet; or a jet that controllably breaks into droplets from the nozzle after leaving the nozzle.

2. The system of claim 1, wherein the housing comprises an vacuum port in communication with the internal cavity and with the valve system for enabling a vacuum to be applied to the internal cavity to help create and/or shape the pressure waveform.

3. The system of claim 2, wherein the valve system comprises a vacuum valve in communication with the controller and the vacuum port, and configured to expose the internal cavity to a vacuum in response to a signal from the controller.

4. The system of claim 1, wherein the housing comprises an ambient and/or offset port in communication with the internal cavity and with the valve system for enabling the internal cavity to be vented to an ambient atmosphere and to help at least one of create or shape the pressure waveform.

5. The system of claim 4, wherein the valve system comprises an ambient valve in communication with the controller and with the ambient and/or offset port, and configured to expose the internal cavity to the ambient atmosphere or a constant offset pressure when at least partially opened.

6. The system of claim 1, wherein the housing comprises an inflow port in communication with the internal cavity and with the valve system for enabling the internal cavity to be pressurized and to help thus help to at least one of create or shape the pressure waveform.

7. The system of claim 6, wherein the valve system comprises an inflow valve in communication with the controller and with the inflow port to enable pressurization of the internal cavity when the inflow valve is at least partially opened and applying a pressurized fluid through the inflow valve.

8. The system of claim 1, further comprising a feedstock reservoir in communication with the feedstock infeed port.

9. The system of claim 8, wherein the feedstock reservoir comprises a motorized wire feeder for feeding solid wire, filament, or rod as the feedstock into the feedstock infeed port.

10. The system of claim 8, wherein the feedstock reservoir comprises a reservoir configured to feed the feedstock into the feedstock infeed port by gravity.

11. The system of claim 1, further comprising a signal generator in communication with the controller and the valve system, and configured to generate control signals to control the valve system as needed to at least one of create or shape the pressure waveform.

12. The system of claim 1, wherein the printhead system further comprises a heater operably associated with the housing for heating the feedstock contained within the internal cavity.

13. The system of claim 12, wherein the heater comprises a resistive heater.

14. The system of claim 12, wherein the heater comprises an inductive heater.

15. The system of claim 1, further comprising a printhead motion control subsystem response to control signals from the controller, and configured to control motion of the printhead system relative to a build table on which the feedstock is being deposited.

16. The system of claim 1, further comprising a camera for imaging the feedstock as the feedstock is ejected from the nozzle of the housing.

* * * * *